(12) United States Patent
Camp, Jr.

(10) Patent No.: US 7,768,977 B2
(45) Date of Patent: Aug. 3, 2010

(54) ESTABLISHING A COMMUNICATION LINK BY SELECTIVELY POWERING A TRANSCEIVER BASED ON A COMMUNICATION REQUEST RECEIVED BY ANOTHER TRANSCEIVER

(75) Inventor: William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1260 days.

(21) Appl. No.: 10/701,100

(22) Filed: Nov. 4, 2003

(65) Prior Publication Data

US 2005/0094589 A1 May 5, 2005

(51) Int. Cl.
*H04B 7/212* (2006.01)
(52) U.S. Cl. .................. 370/332; 370/311; 370/335; 370/336; 370/337; 370/338; 455/552.1; 455/553.1; 455/74; 455/78; 455/426.1
(58) Field of Classification Search .............. 370/334, 370/331, 338, 332, 311, 336, 337; 455/436, 455/552.1, 553.1, 74, 78, 426.1, 574, 277.1
See application file for complete search history.

(56) References Cited

U.S. PATENT DOCUMENTS

| | | | |
|---|---|---|---|
| 5,239,306 A * | 8/1993 | Siwiak et al. | 340/7.35 |
| 5,697,055 A * | 12/1997 | Gilhousen et al. | 455/436 |
| 6,445,921 B1 * | 9/2002 | Bell | 455/426.1 |
| 7,155,232 B2 * | 12/2006 | Godfrey | 455/450 |
| 2002/0141441 A1 * | 10/2002 | Neumann et al. | 370/465 |
| 2002/0183062 A1 * | 12/2002 | Kubosawa | 455/436 |
| 2003/0002525 A1 * | 1/2003 | Grilli et al. | 370/465 |
| 2004/0125232 A1 * | 7/2004 | Matsunami | 348/500 |
| 2004/0198217 A1 * | 10/2004 | Lee et al. | 455/3.01 |
| 2004/0252656 A1 * | 12/2004 | Shiu et al. | 370/328 |

(Continued)

FOREIGN PATENT DOCUMENTS

EP  0 784 412 A2  7/1997

(Continued)

OTHER PUBLICATIONS

International Search Report and Written Opinion for PCT application US2004/034382, dated Feb. 14, 2005.

*Primary Examiner*—Vincent P Harper
*Assistant Examiner*—Fred A Casca
(74) *Attorney, Agent, or Firm*—Myers Bigel Sibley & Sajovec, P.A.

(57) ABSTRACT

A first transceiver in a wireless terminal receives a communication request from a first wireless network. Based on the received communication request, power is selectively provided to a second transceiver in the wireless terminal, and the second transceiver is used to establish a communication link with a second wireless terminal. The first transceiver may be a TDMA transceiver, CDMA transceiver, wireless local area network transceiver, Bluetooth transceiver, or a digital television receiver that receives the communication request from a corresponding type of network, and the second transceiver may be a different one of the receiver types that establishes a communication link with a corresponding type of network. The first transceiver may receive assistance information from the first wireless network. The assistance information may include information that can be used to establish a communication link through the second transceiver with the second wireless network.

8 Claims, 4 Drawing Sheets

U.S. PATENT DOCUMENTS

2004/0264424 A1* 12/2004 Hirsbrunner et al. ........ 370/338
2005/0054368 A1*  3/2005 Amerga ...................... 455/525

FOREIGN PATENT DOCUMENTS

| EP | 1 235 365 A1 | 8/2002 |
| WO | WO 98/02006 | 1/1998 |
| WO | WO 01/10150 A1 | 2/2001 |

* cited by examiner

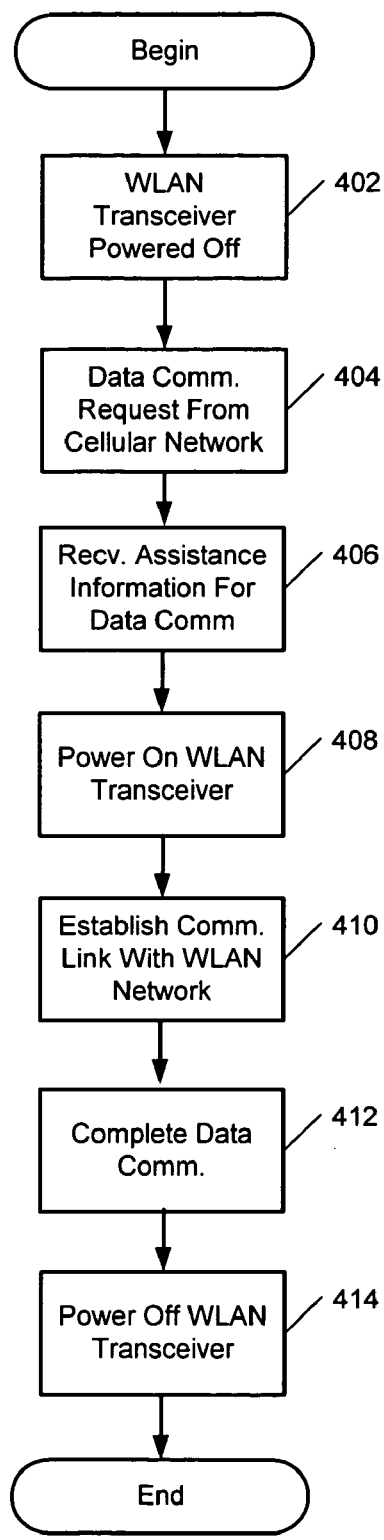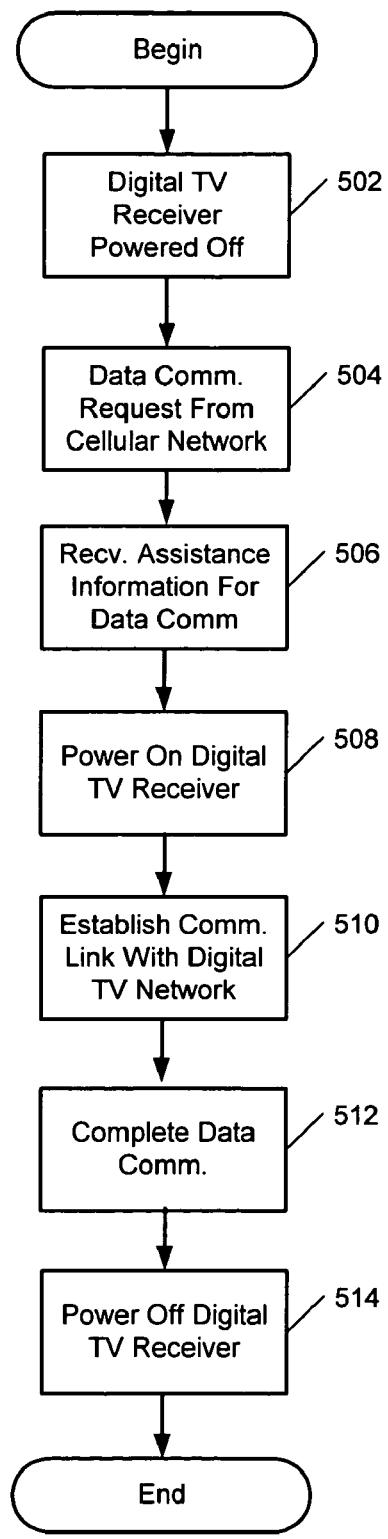

ESTABLISHING A COMMUNICATION LINK BY SELECTIVELY POWERING A TRANSCEIVER BASED ON A COMMUNICATION REQUEST RECEIVED BY ANOTHER TRANSCEIVER

FIELD OF THE INVENTION

This invention relates to wireless communication terminals, and more particularly to wireless terminals that can communicate over more than one wireless communication interface, and methods thereof.

BACKGROUND OF THE INVENTION

Many different wireless communication technologies can now be used to provide wireless voice and data communication. Multi-mode wireless terminals have been developed that can communicate with, for example, Global System for Mobile Communications systems, ANSI-136 systems, Advanced Mobile Phone Service systems, Code Division Multiple Access systems, Bluetooth systems, and Wireless Local Area Network systems. In some geographic areas, each of these wireless communication systems may be available for use by wireless terminals.

SUMMARY OF THE INVENTION

According to some embodiments of the present invention, a first transceiver in a wireless terminal receives a communication request from a first wireless network. Based on the received communication request, power is selectively provided to a second transceiver in the wireless terminal, and the second transceiver is used to establish a communication link with a second wireless terminal.

Selectively providing power to the second transceiver may conserve power in the wireless terminal. For example, the first transceiver (e.g., a TDMA transceiver) may consume less power than the second transceiver (e.g., a WCDMA transceiver, wireless local area network transceiver, and/or digital television receiver) in a standby mode waiting for a communication request. When the communication request is received, the second transceiver may be powered-ON and used to establish a communication link with the second wireless network to complete a communication.

According to various further embodiments of the present invention, the first transceiver may be a TDMA receiver that receives the communication request from a TDMA cellular network, and the second transceiver may be a CDMA receiver that establishes a communication link with a CDMA cellular network. The first transceiver may be a cellular transceiver (e.g., TDMA transceiver and/or CDMA transceiver) that receives the communication request from a cellular network, and the second transceiver may be a wireless local area network transceiver and/or a digital television receiver that establishes a communication link with a wireless local area network and/or a digital television network.

According to various further embodiments of the present invention, the first transceiver may receive assistance information from the first wireless network. The assistance information may include information that can be used to establish a communication link through the second transceiver with the second wireless network. For example, the assistance information may include a timing indicator and an offset between the timing indicator and a code for a communication link with a CDMA cellular network, the identity of the second wireless network, and/or frequencies that may be used to communicate with the second wireless network. When the communication request relates to a data communication, the assistance information may identify an Internet service provider and/or a subscriber account from which data may be retrieved using the second transceiver communicating through the second wireless network. The assistance information may allow the wireless terminal to more rapidly locate the second wireless network, establish a communication link with the second wireless network, and/or to complete a requested communication.

BRIEF DESCRIPTION OF THE DRAWINGS

FIG. 4 illustrates operations for establishing a communication link from a wireless terminal through a wireless local area network according to various embodiments of the present invention.

FIG. 5 illustrates operations for establishing a communication link from a wireless terminal through a digital television network according to various embodiments of the present invention.

DETAILED DESCRIPTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or operational illustrations of methods and wireless terminals according to embodiments of the invention. It is understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "wireless terminal" includes, but is not limited to, a terminal that is configured to communicate via a wireless interface such as, for example, a cellular interface, a Wireless Local Area Network interface (WLAN), Bluetooth interface, digital television network interface, another RF communication interface, and/or an optical interface. Examples of wireless terminals may include, but are not limited to, a cellular wireless terminal; a personal communication terminal that may combine a cellular wireless terminal with data processing, facsimile and/or data communications capabilities; a personal data assistance (PDA) that can include a wireless transceiver, pager, Internet/intranet access, local area network interface, wide area network interface, Web browser, organizer, and/or calendar; and/or a mobile or fixed computer or other device that includes a wireless transceiver.

Figure 1:
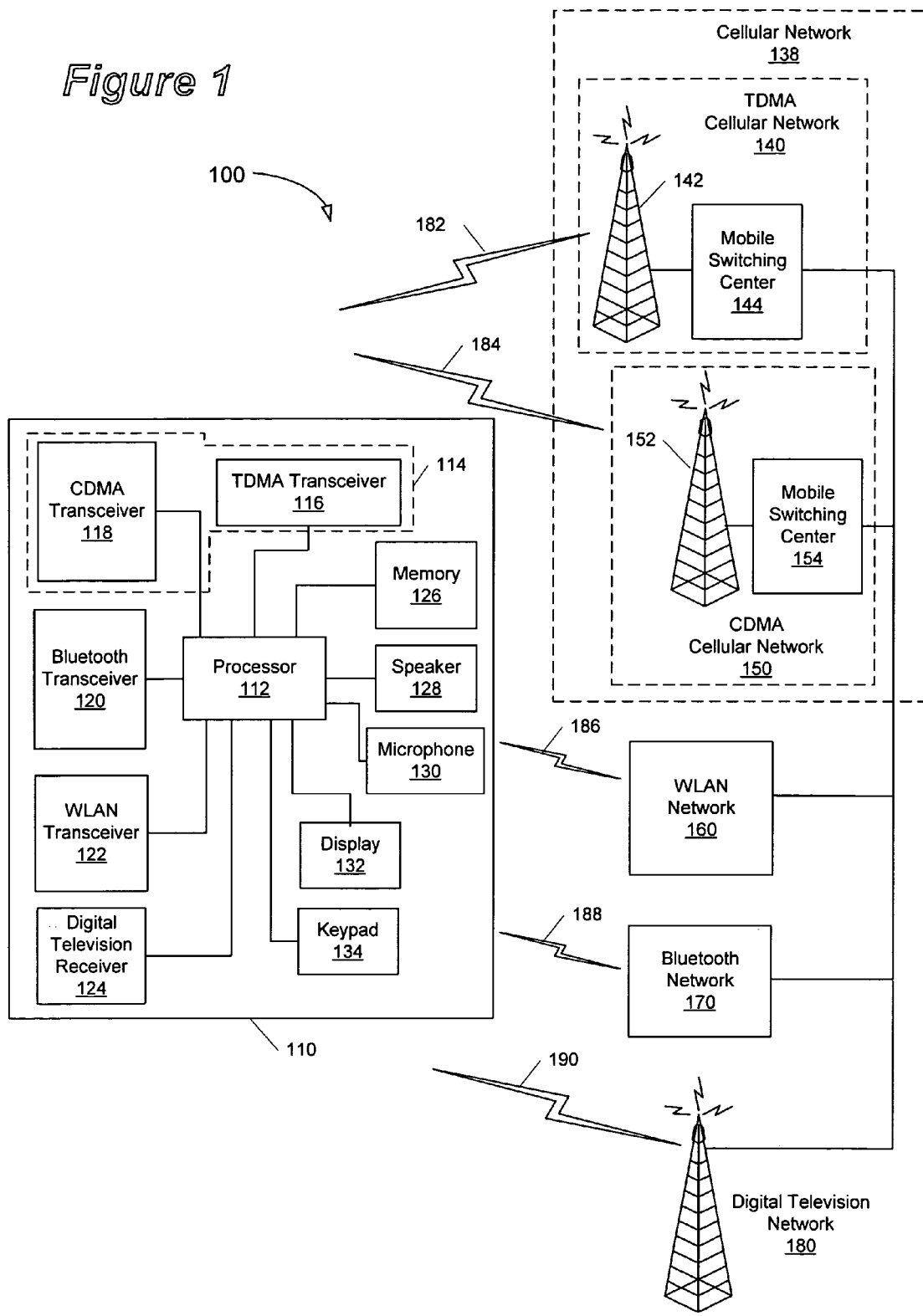
FIG. 1 illustrates a wireless communication system according to various embodiments of the present invention.

FIG. 1 is a functional block diagram of an exemplary wireless communication system 100 according to various embodiments of the present invention. The wireless communication system 100 includes a wireless terminal 110, a cellular network 138, a Wireless Local Area Network (WLAN) 160, a Bluetooth Network 170, and a digital television network 180. The cellular network 138 may include one or more different types of cellular networks, which may be owned and/or operated by the same or different operators. For purposes of illustration only, the cellular network 138 is illustrated as including a TDMA cellular network 140 and a Code Division Multiple Access (CDMA) cellular network 150, however, the cellular network 138 may include only one of these networks and/or may include other types of cellular networks. The wireless terminal 110 communicates with the TDMA cellular network 140 over a wireless communication link (e.g., channel) 182 using a communication protocol that may include, but is not limited to, ANSI-136, Global Standard for Mobile (GSM), General Packet Radio Service (GPRS), Enhanced Data rates for GSM Evolution (EDGE), and/or AMPS (Advanced Mobile Phone Service) protocol. The wireless terminal 110 communicates with the CDMA cellular network 150 over a wireless communication link (e.g., channel) 184 using a communication protocol that may include, but is not limited to, CDMA (e.g., IS-95), wideband-CDMA, CDMA2000, and Universal Mobile Telecommunications System (UMTS). The wireless terminal 110 communicates with the WLAN network 160 over a wireless communication link 186 using a communication protocol that may include, but is not limited to, 802.11b, 802.11a, 802.11g, 802.11e, 802.11i, and/or other WLAN standards, and communicates with the Bluetooth Network 170 over a wireless communication link 188 using a Bluetooth protocol. The wireless terminal 110 may also receive information from the digital television network 180 over a wireless interface 190 using a communication protocol that may include, but is not limited to, a Digital Television protocol and/or a Digital Video Broadcast (DVB) protocol such as DVB-T, DVB-H, or ISDB. Communication protocols as used herein may specify the information communicated, the timing, the frequency, the modulation, and/or the operations for setting-up and/or maintaining communication from, to, and/or between two communication devices. As used herein, the term "communicate" means transmit, receive, and/or both transmit and receive.

The TDMA cellular network 140 may include a base station transceiver 142 that relays information between the wireless communication link 182 and the mobile switching center 144. The CDMA cellular network 150 may include a base station transceiver 152 that relays information between the wireless communication link 184 and the mobile switching center 154. For purposes of illustration, only one of each the networks 140, 150, 160, 170, and 180 has been illustrated, however it is to be understood that hundreds or thousands of such networks may be employed to provide wireless communication services over geographically dispersed regions or cells.

The wireless terminal 110 may include a processor 112, a cellular transceiver 114, which may include a TDMA transceiver 116 and/or a CDMA transceiver 118, a Bluetooth transceiver 120, a WLAN transceiver 122, a digital television receiver 124, a memory 126, a speaker 128, a microphone 130, a display 132, and a keypad 134. The memory 126 may be separate from, or at least partially within, the processor 112. The processor 112 may include more than one processing component, such as, for example, a general purpose processor and a digital signal processor, which may be enclosed in a common package or separate and apart from one another. The TDMA transceiver 116, the CDMA transceiver 118, the Bluetooth transceiver 120, and the WLAN transceiver 122 may each include a transmitter and a receiver to allow two way communications, but the present invention is not limited to such devices and, as used herein, a "transceiver" may include both a receiver and a transmitter or only one such communication circuit.

The transceivers 116, 118, 120, and 122 may be configured to perform baseband processing on information that is transmitted and/or received. Such baseband processing can include modulating and/or demodulating information, channel coding and/or channel decoding information, and/or may be configured to control communications according to one or more communication protocols. The digital television receiver 124 may be configured to perform baseband processing on information that is received from the digital television network 180. Such baseband processing by the digital television receiver 124 may include demodulating information, channel decoding information, and/or controlling communications according to one or more communication protocols.

The processor 112 may be configured to perform various communication and application related functions of the wireless terminal 110 that may be defined by software in the memory 126. For example, the processor 112 may perform some of the baseband processing of information that is to be transmitted and/or received by one or more of the transceivers 116, 118, 120, and 122 and/or the digital television receiver 124. As described above, the baseband processing may include modulating and/or demodulating information channel coding and/or channel decoding information, and/or controlling communications according to one or more communication protocols.

According to various embodiments of the present invention, the wireless terminal 110 is configured to receive a communication request from one of the wireless networks 140, 150, 160, 170, and 180, and is configured to establish a communication link with a different one of the wireless networks 140, 150, 160, 170, and 180 based on the communication request. For example, the wireless terminal 110 may receive a voice page and/or data message page from the TDMA cellular network 140, and may then establish a communication link with the CDMA cellular network 150 or the WLAN network 160 to establish a voice call and/or to complete a data communication. The wireless terminal 110 may also selectively provide power to one or more of the transceivers 116, 118, 120, and 122 and/or the digital television receiver 124 (e.g., power ON and/or power OFF) based on the received communication request.

In some embodiments of the present invention, one or more of the transceivers 116, 118, 120, and 122 and/or the digital television receiver 124 may be not powered (e.g., turned-OFF) until a communication request is received by another powered (e.g., turned-ON) one of the transceivers 116, 118, 120, and 122 and/or the digital television receiver 124. Responsive to the communication request, the processor 112 may provide power to one or more of the transceivers 116, 118, 120, and 122 and/or the digital television receiver 124 that is associated with the received communication request, and a communication link may then be established through the powered device.

Selectively powering the transceivers 116, 118, 120, and 122 and/or the digital television receiver 124 may conserve power in the wireless terminal. For example, the CDMA transceiver 118, the WLAN transceiver 122, and/or the digital television receiver 1124 may consume significantly more power than the TDMA transceiver 116 when in a standby mode waiting for a communication request. Because of the complexity and time delay that may be associated with locating and synchronizing with a CDMA coded signal, conventional wireless terminals usually continuously power a CDMA transceiver so that it is ready to handle a call (i.e., don't switch the CDMA transceiver to a standby mode). Consequently, a WCDMA type of CDMA transceiver 118 and/or a CDMA type of WLAN transceiver 112 may consume considerably more power than the TDMA transceiver 116 which may be switched to a standby mode. According to some embodiments of the present invention, a lower power consuming one of the transceivers 116, 118, 120, and 122 and/or the digital television receiver 124 may be used to look for a communication request while one or more the others are powered-off. Then, based on a received communication request, a higher power consuming one of the transceivers 116, 118, 120, and 122 and/or the digital television receiver 124 may be powered-on to perform the requested communications.

Figure 2:
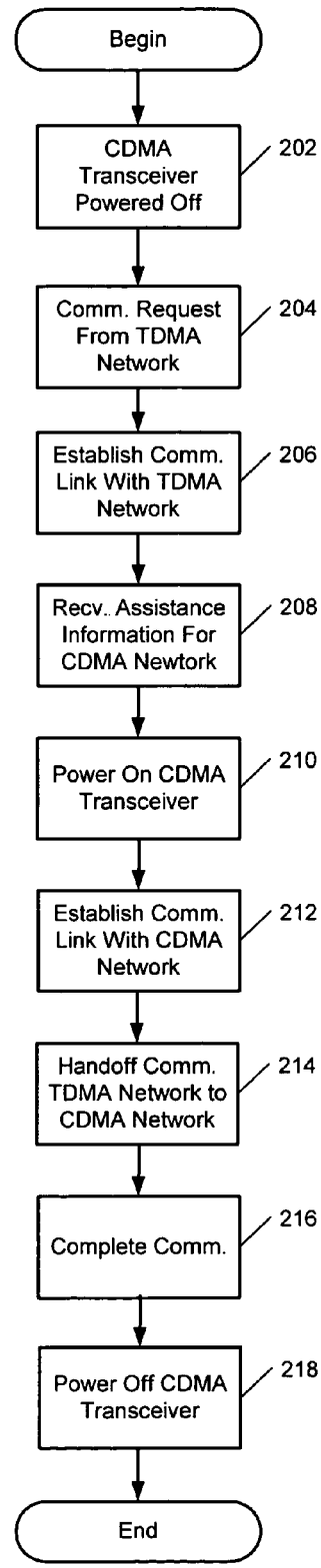
FIG. 2 illustrates operations for establishing a communication link from a wireless terminal according to various embodiments of the present invention.

FIG. 2 illustrates operations that may be used to receive a communication request from the TDMA cellular network 140, and then to establish a communication link with the CDMA cellular network 150 based on the received communication request. At Block 202, the CDMA transceiver 118 is powered off, which may conserve power in the wireless terminal 110. At Block 204, the TDMA transceiver 116 is used to receive a communication request from the TDMA cellular network 140. The communication request may be communicated through the wireless communication link 182 as, for example, a call page and/or data page on a control channel and/or a traffic channel, and/or may be communicated as a data message, such as a short message service (SMS) data message, an enhanced messaging service (EMS) data message, and/or an email message. At Block 206, an initial communication link is established between the TDMA transceiver 116 and the TDMA cellular network 140. The initial communication link may be used to, for example, begin a voice call and/or to begin communicating data.

At Block 208, assistance information relating to the CDMA cellular network 150 is received from the TDMA cellular network 140 through, for example, the initial communication link and/or as a part of, or in addition, to the communication request at Block 204. The assistance information includes information that may be used to establish a communication link with the CDMA cellular network 150. For example, the assistance information may include a timing indicator and an offset between the timing indicator and a code for a communication link with the CDMA cellular network 150, the identity of the CDMA cellular network 150, and/or the frequencies that may be used to communicate with the CDMA cellular network 150. Accordingly, the assistance information may enable the wireless terminal 110 to more rapidly establish a communication link with the CDMA cellular network 150. When the communication request relates to a data communication, the assistance information may additionally, or alternatively, identify an Internet service provider and/or subscriber account from which data may be retrieved through the CDMA cellular network 150.

At Block 210, the CDMA transceiver 118 is powered-ON, and at Block 212 a communication link is established with the CDMA cellular network 150 using the CDMA transceiver 118 and assistance information that may have been obtained at Block 208. At Block 214, communications are handed-off from the TDMA transceiver 116 to the CDMA transceiver 118 so that communications with the TDMA cellular network 140 can continue with the CDMA cellular network 150. At Block 216, communications with the CDMA cellular network 150 are completed, and at Block 218, the CDMA transceiver 118 is powered-OFF.

Figure 3:
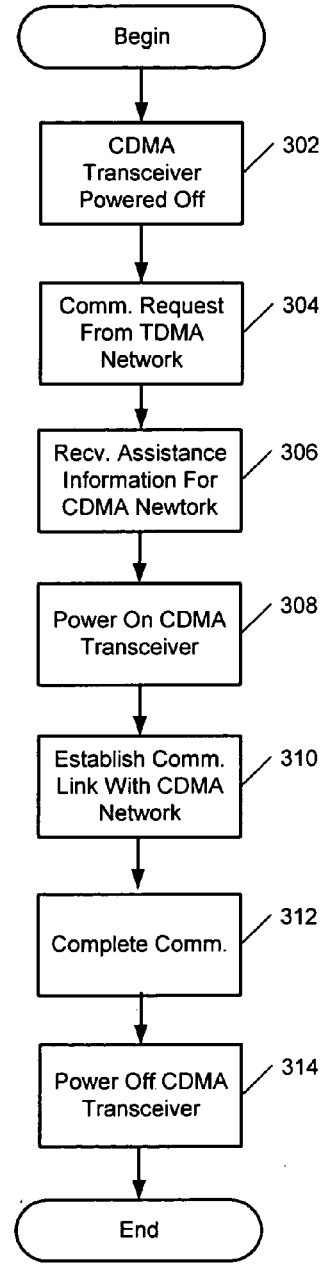
FIG. 3 illustrates operations for establishing a communication link from a wireless terminal according to various alternate embodiments of the present invention.

FIG. 3 illustrates operations that may be used to receive a communication request from the TDMA cellular network 140, and then to establish a communication link with the CDMA cellular network 150 according to some embodiments of the present invention. The operations shown in FIG. 3 may be substantially the same as those described in FIG. 2, except that in FIG. 3, an initial communication link is not established with the TDMA cellular network 140 (Block 206 of FIG. 2) and then handed-off to the CDMA cellular network 150 (Block 214 of FIG. 2). Accordingly, the operations of Blocks 302, 304, 306, 308, 312, and 314 in FIG. 3 may operate in the same or similar way as was described for corresponding Blocks 202, 204, 208, 210, 216, and 218 in FIG. 2. At Block 310, a communication link is established with the CDMA cellular network 150 using the CDMA transceiver 118 and assistance information that may have been obtained at Block 306. In contrast to Block 212 of FIG. 2, the communication link established at Block 310 is not associated with a hand-off of on-going communications from the TDMA cellular network 140 to the CDMA cellular network 150.

FIG. 4 illustrates operations that may be used to receive a communication request from the cellular network 138 and then to establish a communication link with the WLAN network 160 according to some embodiments of the present invention. At Block 402, the WLAN transceiver 122 is powered off, which may conserve power in the wireless terminal 110. At Block 404, the cellular transceiver 114 is used to receive a communication request from the cellular network 138. The communication request may be communicated as a call page and/or data page on a control channel and/or a traffic channel, and/or may be communicated as a data message, such as a short message service (SMS) data message, an enhanced messaging service (EMS) data message, and/or an email message.

At Block 406, assistance information relating to the WLAN network 160 may be received from the cellular network 138 as a part of, or in addition, to the communication request at Block 404. The assistance information includes information that may be used to establish a communication link with the WLAN network 160. For example, the WLAN network 160, a Global Positioning System (GPS) receiver in the wireless terminal 110, and/or the cellular network 138 may determine the location of the wireless terminal 110, which can be used to determine the availability and identity of WLANs that may be nearby the wireless terminal 110. The identity of the nearby WLANs may then be transmitted at Block 406 from the cellular network 138 as the assistance information to the wireless terminal 110. The assistance information may additionally, or alternatively, include a timing indicator, an offset between the timing indicator and a code for a communication link with the WLAN network 160, the frequencies and/or other information that may be used to communicate with the WLAN network 160. Accordingly, the assistance information may enable the wireless terminal 110 to more rapidly establish a communication link with the WLAN network 160. The assistance information may additionally, or alternatively, identify an Internet service provider and/or subscriber account from which data may be retrieved through the WLAN network 160.

At Block 408, the WLAN transceiver 122 is powered-ON, and at Block 410 a communication link is established with the WLAN network 160 using the WLAN transceiver 122 and assistance information that may have been obtained at Block 406. Data communications with the WLAN network 160 are completed at Block 412, and the WLAN transceiver 122 is powered-OFF at Block 414.

As will be appreciated by one who is skill in the art, the same or similar operations that are described above for FIG. 4 may alternatively be used to receive a communication request from the cellular network 138 and then to establish a communication link with the Bluetooth network 170 according to some embodiments of the present invention. These operations for establishing a communication link with the Bluetooth network 170 will not be repeated here for sake of brevity.

FIG. 5 illustrates operations that may be used to receive a communication request from the cellular network 138 and then to establish a communication link with the digital television network 180 according to some embodiments of the present invention. At Block 502, the digital television receiver 124 is powered off, which may conserve power in the wireless terminal 110. At Block 504, the cellular transceiver 114 is used to receive a communication request from the cellular network 138. The communication request may be communicated as a call page and/or data page on a control channel and/or a traffic channel, and/or may be communicated as a data message, such as a short message service (SMS) data message, an enhanced messaging service (EMS) data message, and/or an email message.

At Block 506, assistance information relating to the digital television network 180 may be received from the cellular network 138 as a part of, or in addition, to the communication request at Block 504. The assistance information includes information that may be used to establish a communication link with the digital television network 180. For example, the assistance information may include a timing indicator, an offset between the timing indicator and a code for a communication link with the digital television network 180, the frequencies and/or other information that may be used to receive information from the digital television network 180. Accordingly, the assistance information may enable the wireless terminal 110 to more rapidly establish a communication link with, and receive information from, the digital television network 180.

At Block 508, the digital television receiver 124 is powered-ON, and at Block 510 a communication link is established with the digital television network 180 using the digital television receiver 124 and assistance information that may have been obtained at Block 506. At Block 512, data, such as messages, pictures, and/or video, is received from the digital television network 180. At Block 514, the digital television receiver 124 is powered-OFF.

Figure 6:
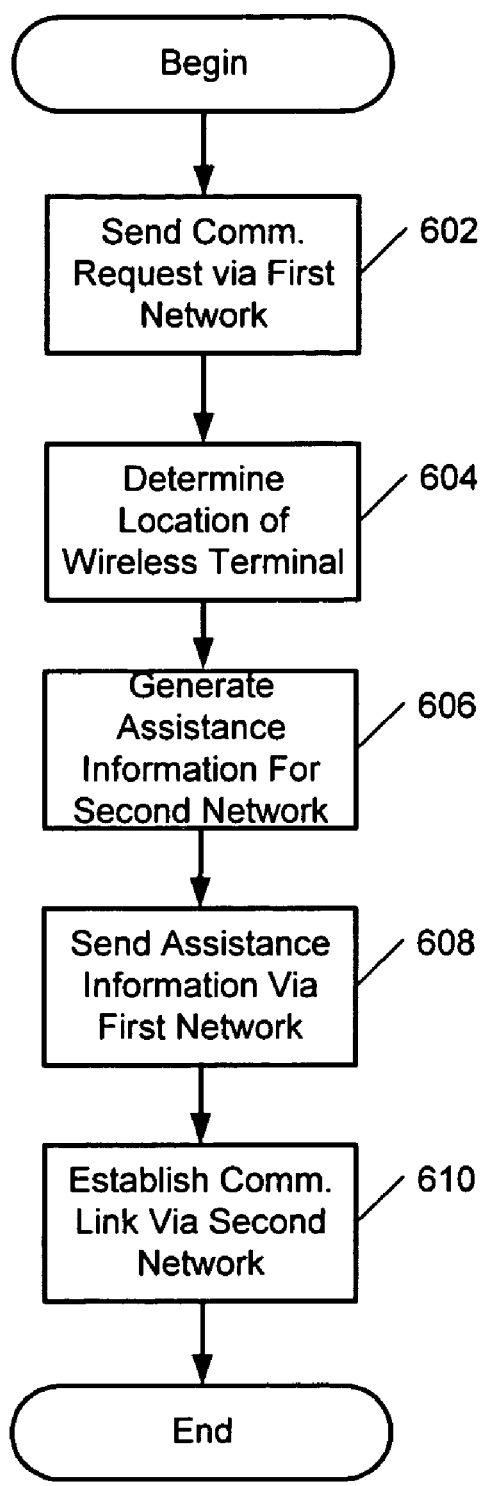
FIG. 6 illustrates operations for making a communication request from one wireless network and establishing a communication link with another wireless network according to various embodiments of the present invention.

FIG. 6 illustrates operations that may be used to make a communication request to the wireless terminal 110 through a first wireless network (e.g, one of the networks 140, 150, 160, 170, and 180), and then used to establish a communication link over a different second wireless network (e.g., a different one of the networks 140, 150, 160, 170, and 180) with the wireless terminal 110. At Block 602, a communication request is communicated by the first wireless network to the wireless terminal 110. The second wireless network may cause the first wireless network to communicate the communication request by, for example, sending a data message (e.g., SMS, EMS, and/or email) through the first wireless network to the wireless terminal 110. At Block 604, the location of the wireless terminal 110 may be determined, and may be used to determine the identity of other nearby wireless networks. At Block 606, assistance information is generated that includes information that may be used to establish a communication link between the wireless terminal 110 and the second wireless network. The assistance information may include the information that was discussed above with regard to Block 208 (shown in FIG. 2), Block 306 (shown in FIG. 3), Block 406 (shown in FIG. 4), and/or Block 506 (shown in FIG. 5), and/or may include the location and/or identity of nearby wireless networks as determined at Block 604. The assistance information may be generated by the second wireless network and/or by the first wireless network. At Block 608, the assistance information is communicated by the first wireless network to the wireless terminal 110. At Block 610, a communication link is established through the second wireless network to the wireless terminal 110.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of establishing a communication link, the method comprising:

receiving a communication request from a TDMA cellular network through a TDMA transceiver in a wireless terminal;

receiving from the TDMA cellular network using the TDMA transceiver in the wireless terminal a timing indicator and an offset between the timing indicator and a code for the communication link with a CDMA cellular network;

powering-on a CDMA transceiver in the wireless terminal in response to the communication request received at the TDMA transceiver; and establishing the communication link from the wireless terminal to the CDMA cellular network through the CDMA transceiver including by operating the CDMA transceiver in the wireless terminal using the timing indicator and the offset to assist the CDMA transceiver's establishment of the communication link with the CDMA cellular network.

2. The method of claim 1, further comprising:

powering-on a wireless local area network transceiver in the wireless terminal in response to another communication request; and establishing another communication link from the wireless terminal to a wireless local area network through the wireless local area network transceiver in response to the other communication request.

3. The method of claim 2, further comprising:
receiving network assistance information from the TDMA cellular network that identifies the wireless local area network that can be used to receive a data message; and
operating the wireless local area network transceiver in the wireless terminal using the assistance information to establish the other communication link with the identified wireless local area network.

4. The method of claim 2, further comprising:
identifying within the communication request, received by the TDMA transceiver from the TDMA cellular network, assistance information that identifies an account with an internet service provider from which a data message can be retrieved; and
operating the wireless local area network transceiver in the wireless terminal using the assistance information to access the identified account and retrieve the data message from the internet service provider through the other communication link with the wireless local area network.

5. The method of Claim 1, wherein:
receiving the communication request from the TDMA cellular network at the TDMA transceiver comprises receiving within the communication request a call page from the TDMA cellular network; and
establishing the communication link from the wireless terminal to the CDMA cellular network using the CDMA transceiver comprises operating the second transceiver to establish a call through the communication link with the CDMA cellular network.

6. The method of Claim 1, wherein:
receiving the communication request from the TDMA cellular network comprises receiving within the communication request an indication of an incoming message from the TDMA cellular network; and
establishing the communication link from the wireless terminal to the CDMA cellular network using the CDMA transceiver comprises operating the CDMA transceiver to receive through the communication link with the CDMA cellular network the incoming message indicated by the communication request.

7. The method of Claim 1, wherein:
receiving the communication request from the TDMA cellular network comprises identifying within the communication request assistance information that identifies at least one of identity of the CDMA cellular network and frequency to be used to establish the communication link with the CDMA cellular network; and
establishing the communication link from the wireless terminal to the CDMA cellular network comprises operating the CDMA transceiver in the wireless terminal using the assistance information to assist the CDMA transceiver's establishment of the communication link with the CDMA cellular network.

8. A wireless terminal, comprising:
a TDMA transceiver that is configured to communicate via a first wireless interface;
a CDMA transceiver that is configured to communicate via a second wireless interface; and
a processor that is configured to power-on the CDMA transceiver in response to a communication request received by the TDMA transceiver, and is configured to establish a communication link over the second wireless interface using the CDMA transceiver that was powered-on in response to the communication request received by the TDMA transceiver, wherein the received communication request contains a timing indicator and an offset between the timing indicator and a code for the second wireless interface, and the processor is configured to use the received timing indicator and the offset to operate the CDMA transceiver to establish the communication link over the second wireless interface.

* * * * *